US012632143B2

(12) United States Patent
Kim et al.

(10) Patent No.: US 12,632,143 B2
(45) Date of Patent: May 19, 2026

(54) TOUCH SENSING APPARATUS FOR SEPARATION OF A MULTI-TOUCH AND TOUCH SENSING METHOD THEREFOR

(71) Applicant: LX SEMICON CO., LTD., Daejeon (KR)

(72) Inventors: Nu Ri Kim, Daejeon (KR); Gyu Min Gil, Daejeon (KR); Young Eun Lee, Daejeon (KR); Sang Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/723,195

(22) PCT Filed: Nov. 30, 2022

(86) PCT No.: PCT/KR2022/019230
§ 371 (c)(1),
(2) Date: Jun. 21, 2024

(87) PCT Pub. No.: WO2023/121034
PCT Pub. Date: Jun. 29, 2023

(65) Prior Publication Data
US 2025/0068279 A1      Feb. 27, 2025

(30) Foreign Application Priority Data

Dec. 24, 2021      (KR) ........................ 10-2021-0187176

(51) Int. Cl.
*G06F 3/041*      (2006.01)

(52) U.S. Cl.
CPC ...... *G06F 3/04166* (2019.05); *G06F 3/04186* (2019.05); *G06F 2203/04104* (2013.01)

(58) Field of Classification Search
CPC ................................................... G06F 3/04166
See application file for complete search history.

(56) References Cited

U.S. PATENT DOCUMENTS

| | | | |
|---|---|---|---|
| 9,880,667 B2 | 1/2018 | Hur | |
| 2010/0295810 A1* | 11/2010 | Nagata .................. | G06F 3/0446 |
| | | | 345/173 |
| 2011/0310040 A1 | 12/2011 | Ben-Shalom et al. | |
| 2012/0194452 A1* | 8/2012 | Cho ...................... | G06F 3/0418 |
| | | | 345/173 |
| 2013/0016045 A1 | 1/2013 | Zhao et al. | |
| 2013/0147735 A1 | 6/2013 | Kim et al. | |
| 2013/0169561 A1* | 7/2013 | Park .................... | G06F 3/04186 |
| | | | 345/173 |
| 2017/0336906 A1 | 11/2017 | Yoon et al. | |

FOREIGN PATENT DOCUMENTS

| | | |
|---|---|---|
| KR | 10-2012-0089101 A | 8/2012 |
| KR | 10-2017-0129476 A | 11/2017 |
| KR | 10-2019-0007148 A | 1/2019 |
| KR | 10-2019-0009033 A | 1/2019 |
| KR | 10-2259238 B1 | 6/2021 |

* cited by examiner

*Primary Examiner* — Chun-Nan Lin
(74) *Attorney, Agent, or Firm* — ROTHWELL, FIGG, ERNST & MANBECK, P.C.

(57) ABSTRACT

The present embodiment relates to a touch sensing apparatus and a touch sensing method and, more specifically, to a touch sensing apparatus and a touch sensing method, which rapidly and accurately separate a multi-touch in which touch areas are adjacent to each other.

13 Claims, 17 Drawing Sheets

[Fig 1]
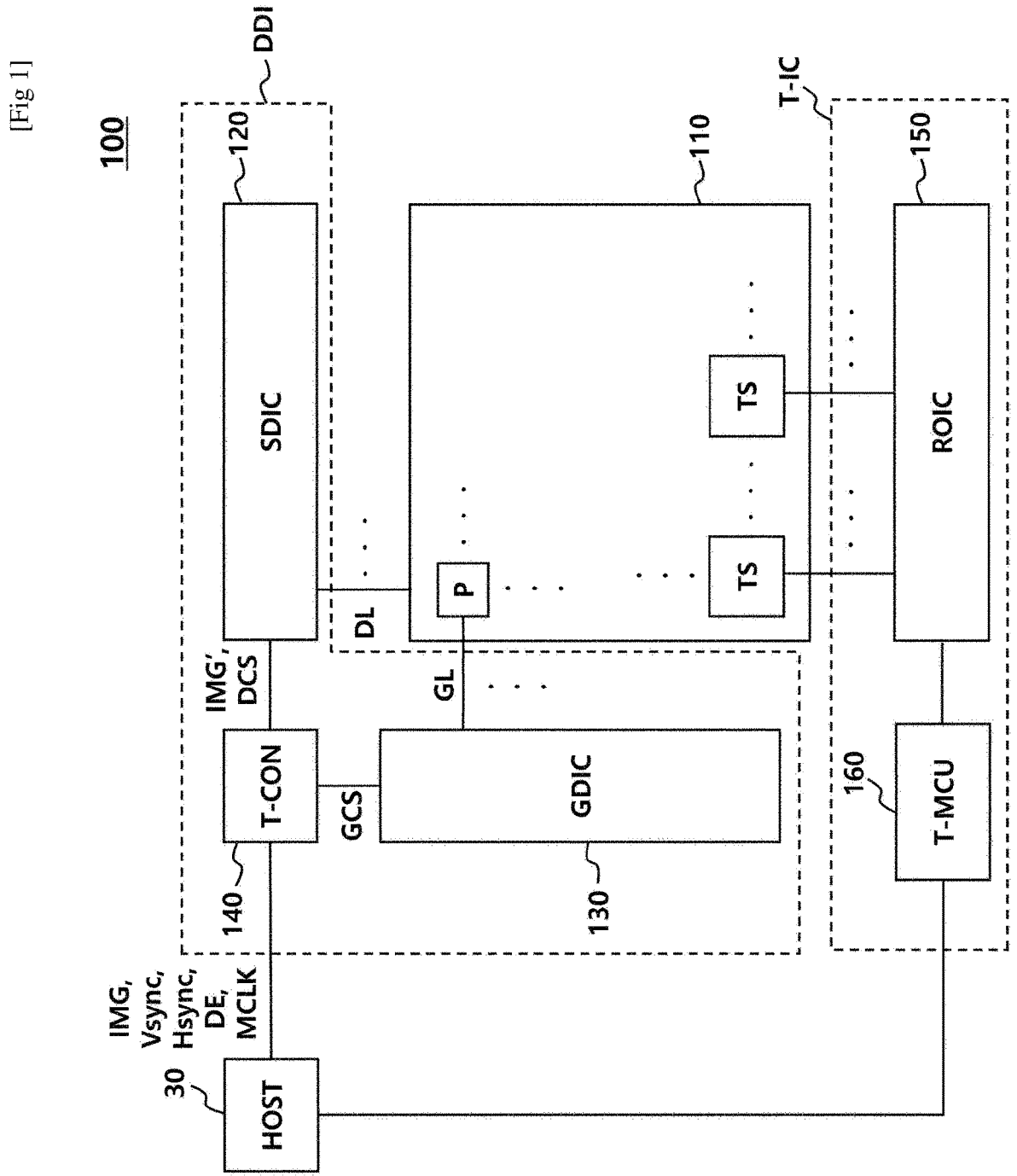

[Fig 2]
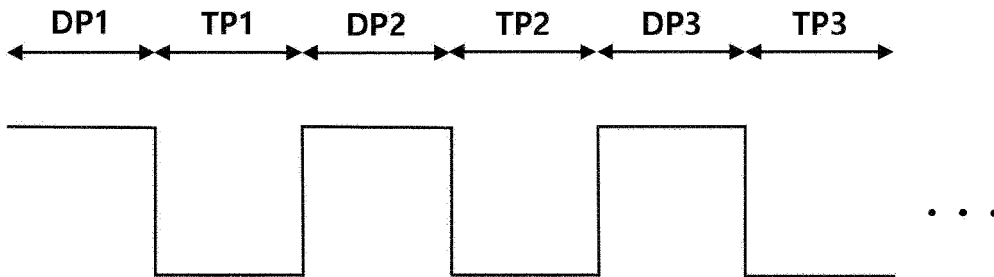

[Fig 3]
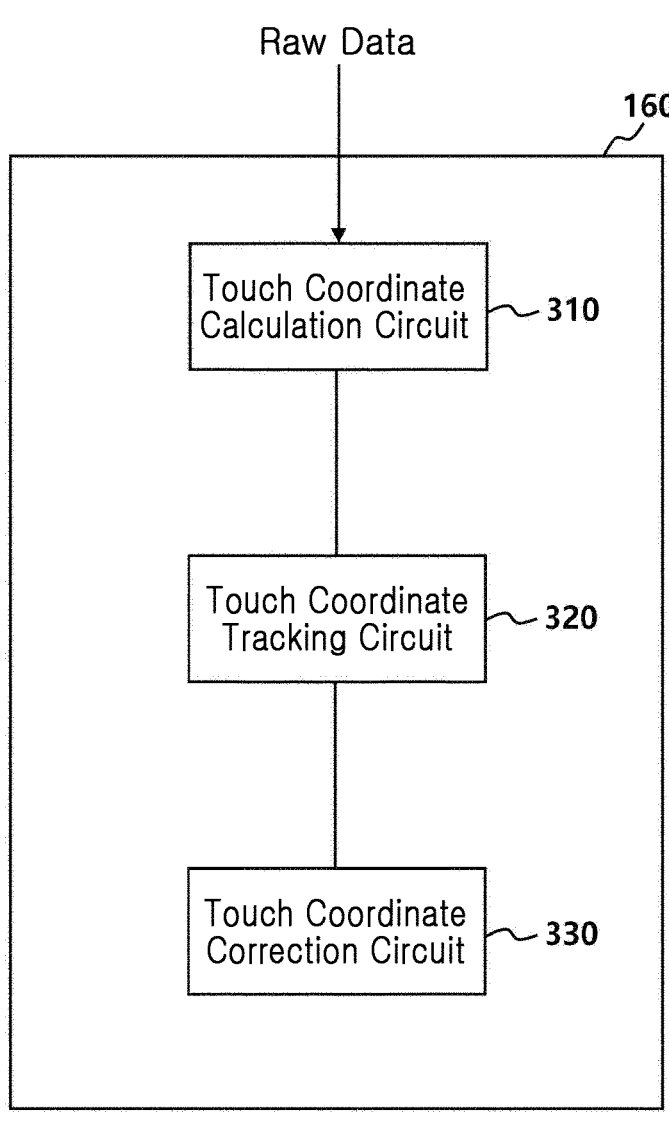

[Fig 4]
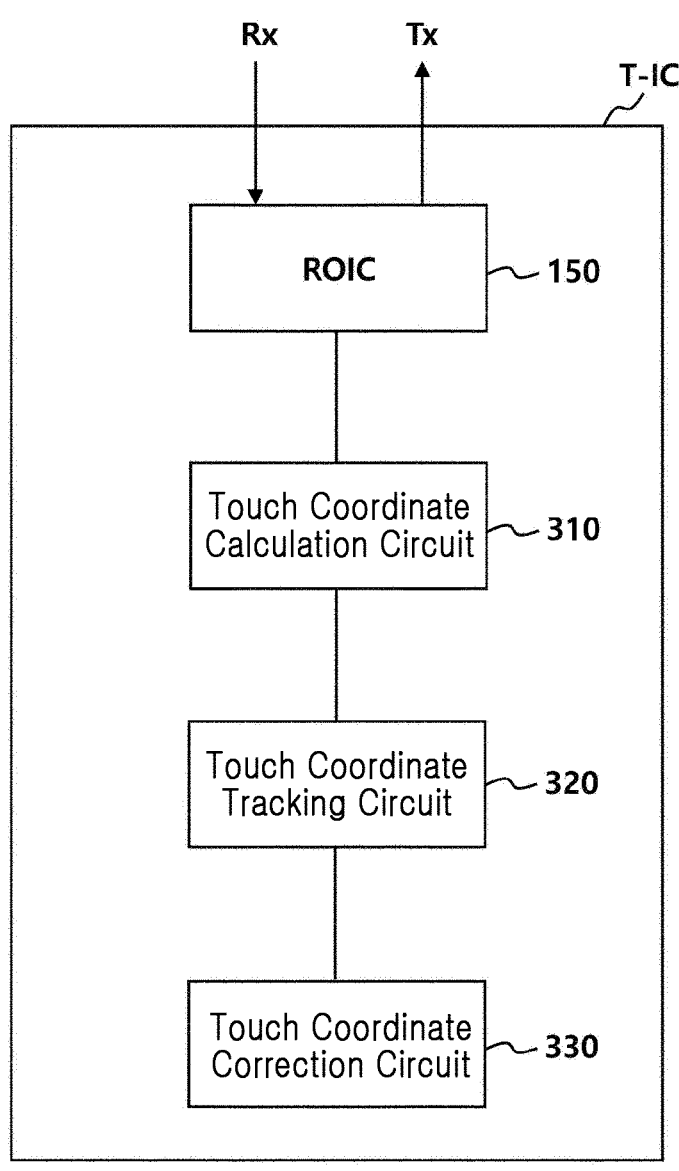

[Fig 5]
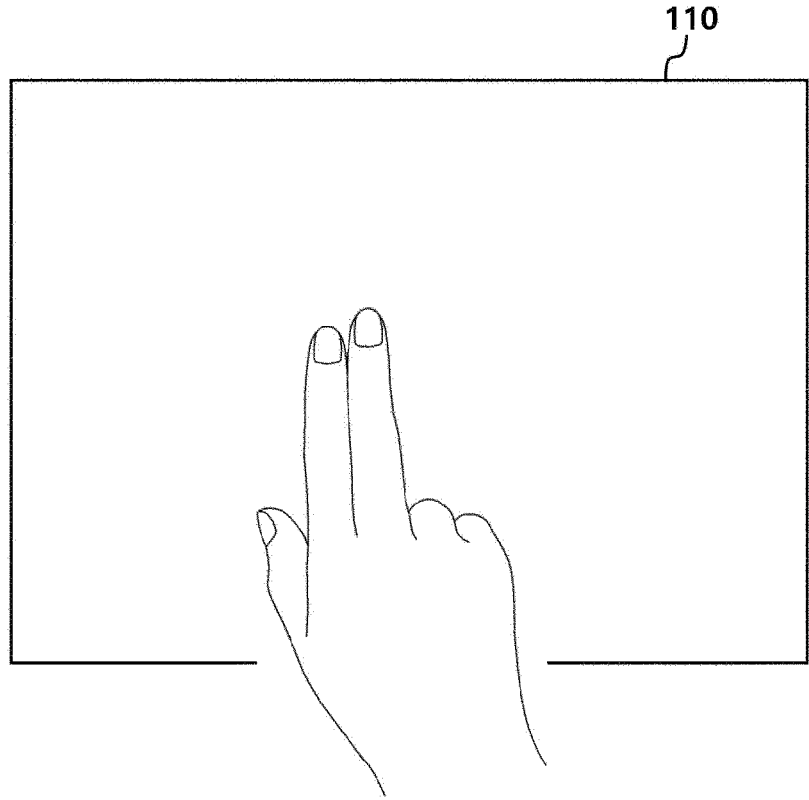

[Fig 6]

|  | c0 | c1 | c2 | c3 | c4 | c5 | c6 | c7 | c8 | c9 | c10 | ... |
|---|---|---|---|---|---|---|---|---|---|---|---|---|
| r0 | 0 | 2 | 0 | 0 | 2 | 0 | 1 | 0 | 0 | 0 | 1 | ... |
| r1 | 1 | 0 | 0 | 0 | 0 | 1 | 0 | 0 | 0 | 1 | 0 | |
| r2 | 0 | 0 | 1 | 0 | 0 | 0 | 2 | 0 | 0 | 1 | 0 | ... |
| r3 | 0 | 1 | 0 | 2 | 3 | 2 | 2 | 1 | 1 | 2 | 0 | ... |
| r4 | 0 | 0 | 0 | 12 | 11 | 3 | 17 | 11 | 12 | 1 | 0 | ... |
| r5 | 0 | 1 | 24 | 42 | 36 | 25 | 41 | 62 | 23 | 2 | 0 | ... |
| r6 | 1 | 0 | 23 | 64 | 37 | 26 | 40 | 64 | 42 | 3 | 1 | ... |
| r7 | 0 | 0 | 2 | 13 | 12 | 2 | 3 | 13 | 3 | 1 | 0 | ... |
| r8 | 1 | 0 | 3 | 2 | 1 | 1 | 0 | 2 | 1 | 0 | 0 | ... |
| r9 | 1 | 0 | 0 | 0 | 0 | 1 | 0 | 0 | 0 | 1 | 0 | ... |
| r10 | 0 | 1 | 1 | 0 | 0 | 0 | 0 | 0 | 0 | 0 | 0 | ... |
| ⋮ | ⋮ | ⋮ | ⋮ | ⋮ | ⋮ | ⋮ | ⋮ | ⋮ | ⋮ | ⋮ | ⋮ | ... |

First Touch Area     Overlapping Area     Second Touch Area

[Fig 7]
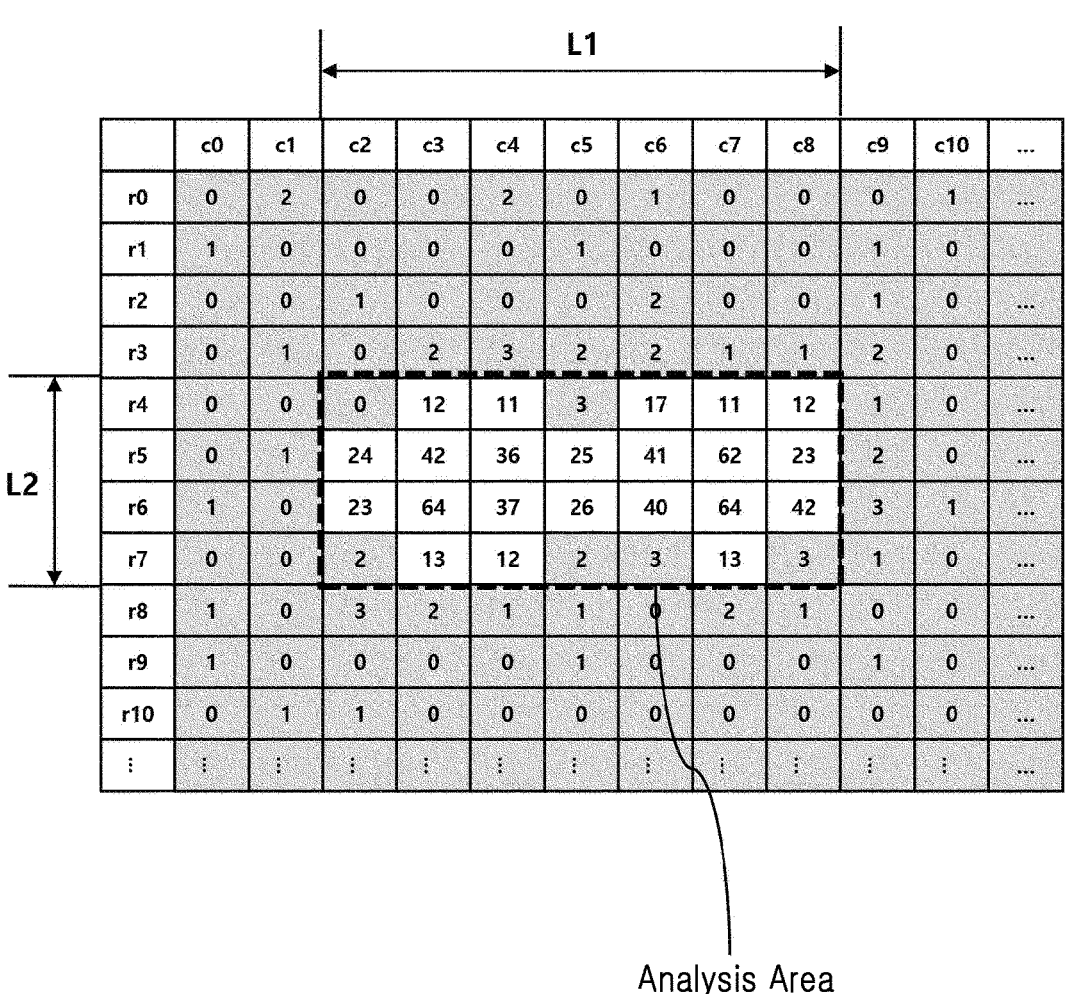
Analysis Area

[Fig 8]

| | c0 | c1 | c2 | c3 | c4 | c5 | c6 | c7 | c8 | c9 | c10 | ... |
|---|---|---|---|---|---|---|---|---|---|---|---|---|
| r0 | 0 | 2 | 0 | 0 | 2 | 0 | 1 | 0 | 0 | 0 | 1 | ... |
| r1 | 1 | 0 | 0 | 0 | 0 | 1 | 0 | 0 | 0 | 1 | 0 | |
| r2 | 0 | 0 | 1 | 0 | 0 | 0 | 2 | 0 | 0 | 1 | 0 | ... |
| r3 | 0 | 1 | 0 | 2 | 3 | 2 | 2 | 1 | 1 | 2 | 0 | ... |
| r4 | 0 | 0 | 0 | 12 | 11 | 3 | 17 | 11 | 12 | 1 | 0 | ... |
| r5 | 0 | 1 | 24 | 42 | 36 | 25 | 41 | 62 | 23 | 2 | 0 | ... |
| r6 | 1 | 0 | 23 | 64 | 37 | 26 | 40 | 64 | 42 | 3 | 1 | ... |
| r7 | 0 | 0 | 2 | 13 | 12 | 2 | 3 | 13 | 3 | 1 | 0 | |
| r8 | 1 | 0 | 3 | 2 | 1 | 1 | 0 | 2 | 1 | 0 | 0 | ... |
| r9 | 1 | 0 | 0 | 0 | 0 | 1 | 0 | 0 | 0 | 1 | 0 | ... |
| r10 | 0 | 1 | 1 | 0 | 0 | 0 | 0 | 0 | 0 | 0 | 0 | ... |
| ⋮ | ⋮ | ⋮ | ⋮ | ⋮ | ⋮ | ⋮ | ⋮ | ⋮ | ⋮ | ⋮ | ⋮ | ... |

LINE1    LINE2    LINE3    LINE4    LINE5    LINE6    LINE7

[Fig 9]
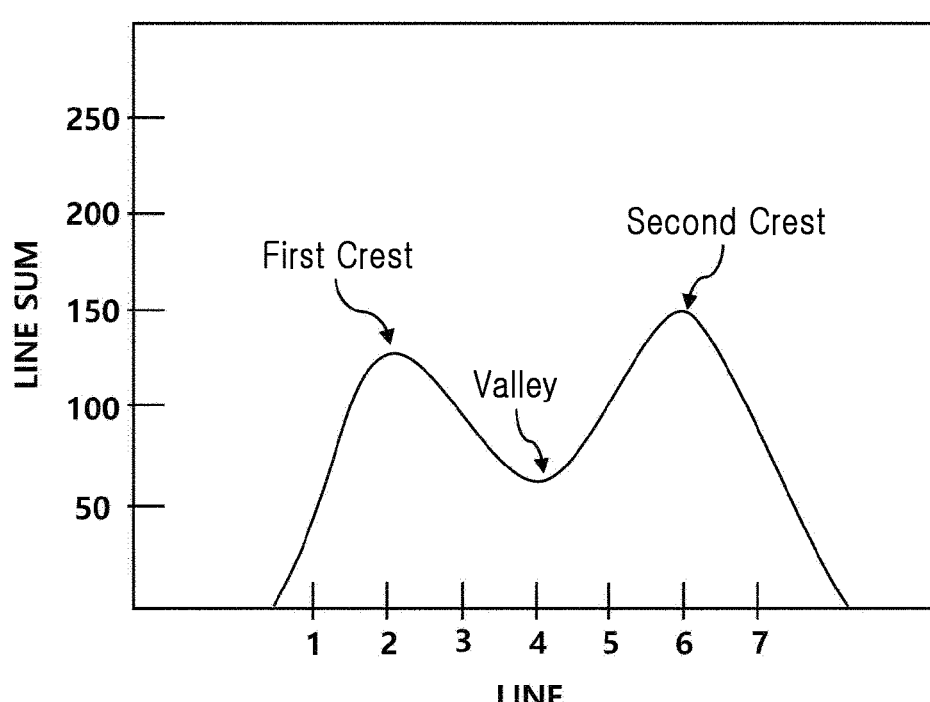

[Fig 10]
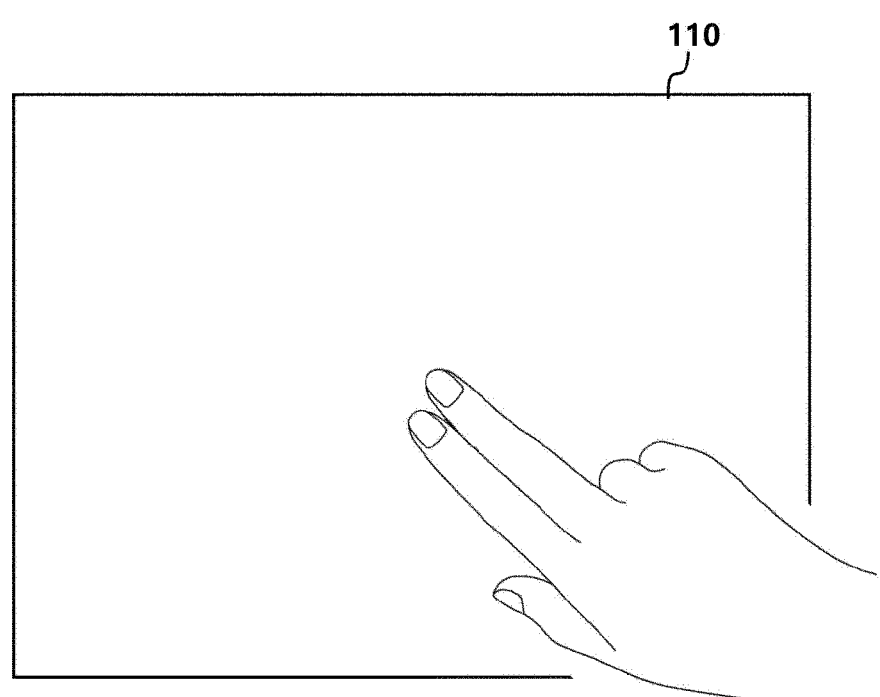

[Fig 11]
First Touch Area
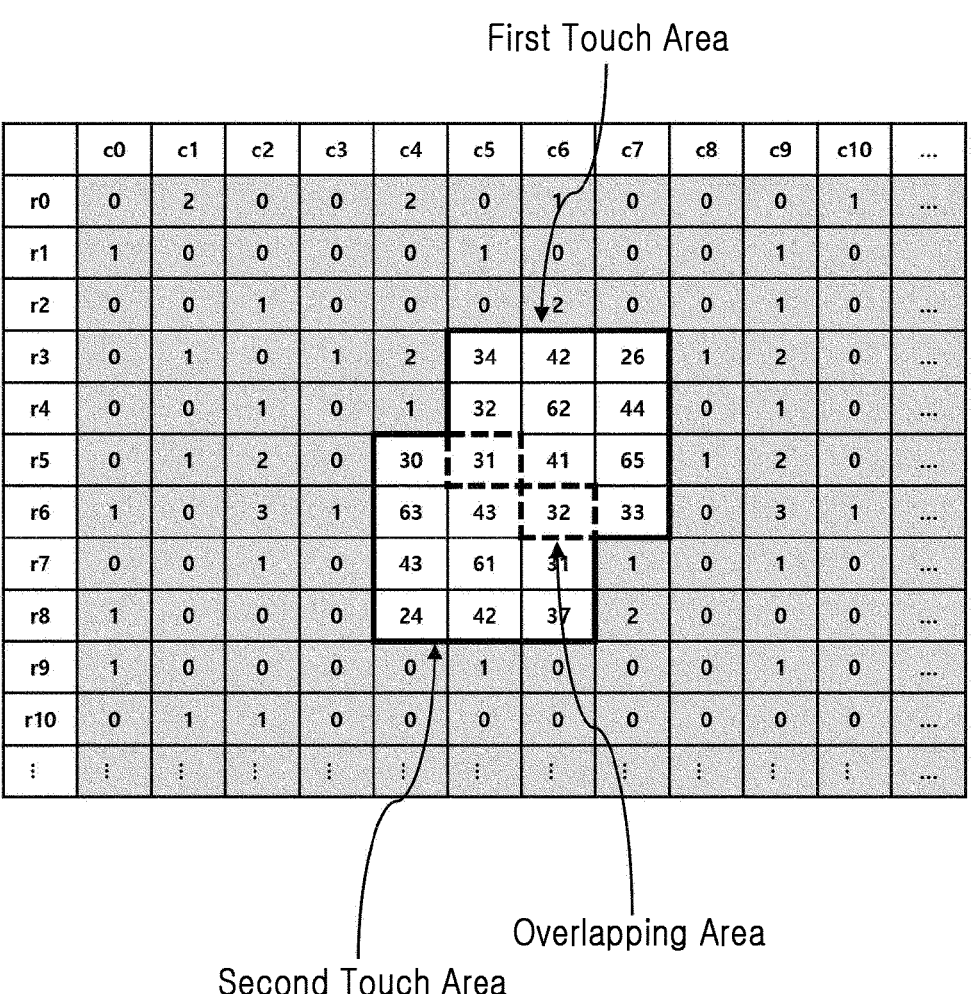
Overlapping Area
Second Touch Area

[Fig 12]

|     | c0 | c1 | c2 | c3 | c4 | c5 | c6 | c7 | c8 | c9 | c10 | ... |
|-----|----|----|----|----|----|----|----|----|----|----|-----|-----|
| r0  | 0  | 2  | 0  | 0  | 2  | 0  | 1  | 0  | 0  | 0  | 1   | ... |
| r1  | 1  | 0  | 0  | 0  | 0  | 1  | 0  | 0  | 0  | 1  | 0   |     |
| r2  | 0  | 0  | 1  | 0  | 0  | 0  | 2  | 0  | 0  | 1  | 0   | ... |
| r3  | 0  | 1  | 0  | 1  | 2  | 34 | 42 | 26 | 1  | 2  | 0   | ... |
| r4  | 0  | 0  | 1  | 0  | 1  | 32 | 62 | 44 | 0  | 1  | 0   | ... |
| r5  | 0  | 1  | 2  | 0  | 30 | 31 | 41 | 65 | 1  | 2  | 0   | ... |
| r6  | 1  | 0  | 3  | 1  | 63 | 43 | 32 | 33 | 0  | 3  | 1   | ... |
| r7  | 0  | 0  | 1  | 0  | 43 | 61 | 31 | 1  | 0  | 1  | 0   | ... |
| r8  | 1  | 0  | 0  | 0  | 24 | 42 | 37 | 2  | 0  | 0  | 0   | ... |
| r9  | 1  | 0  | 0  | 0  | 0  | 1  | 0  | 0  | 0  | 1  | 0   | ... |
| r10 | 0  | 1  | 1  | 0  | 0  | 0  | 0  | 0  | 0  | 0  | 0   | ... |
| :   | :  | :  | :  | :  | :  | :  | :  | :  | :  | :  | :   | ... |

Analysis Area

[Fig 13]
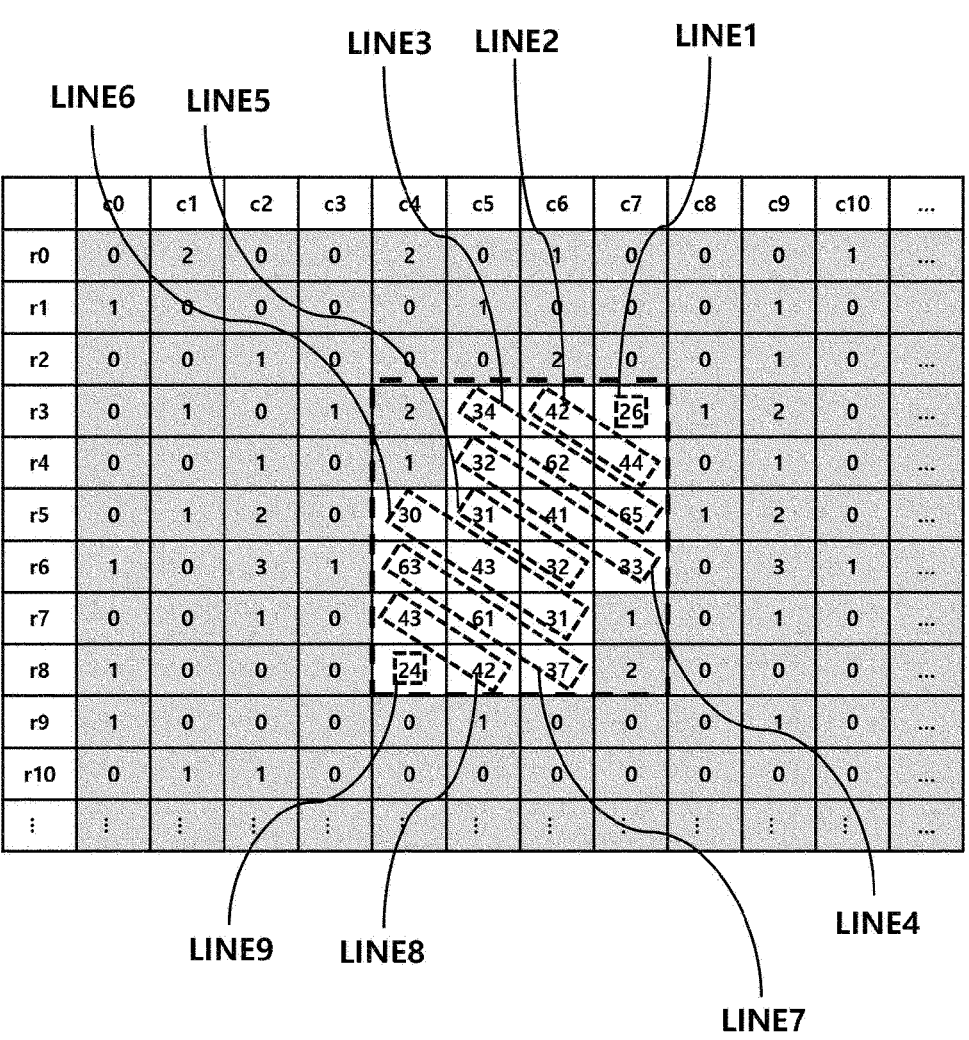

[Fig 14]
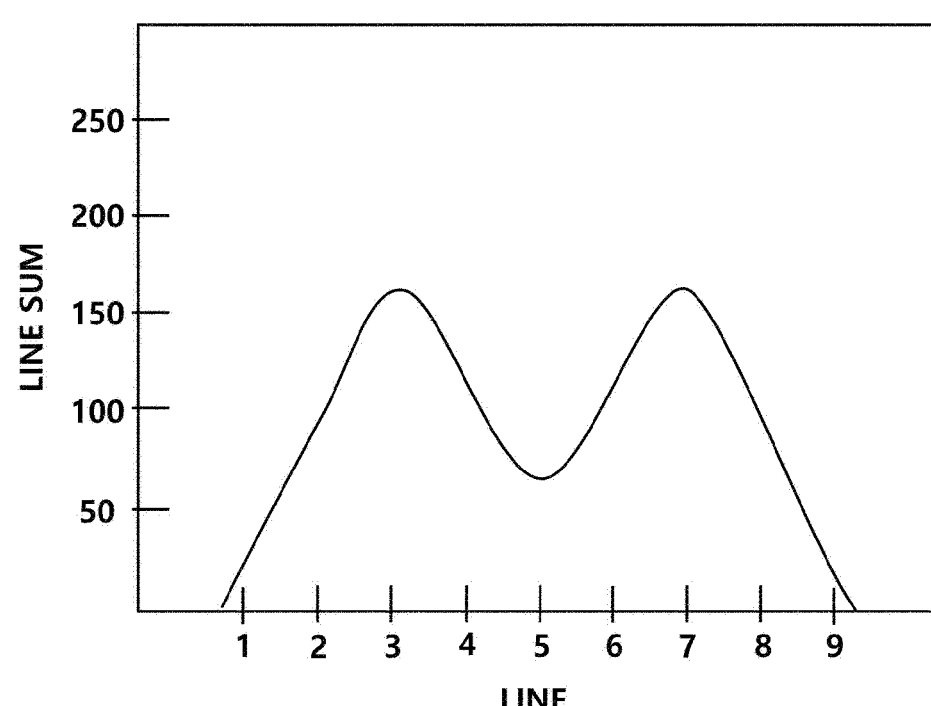

[Fig 15]
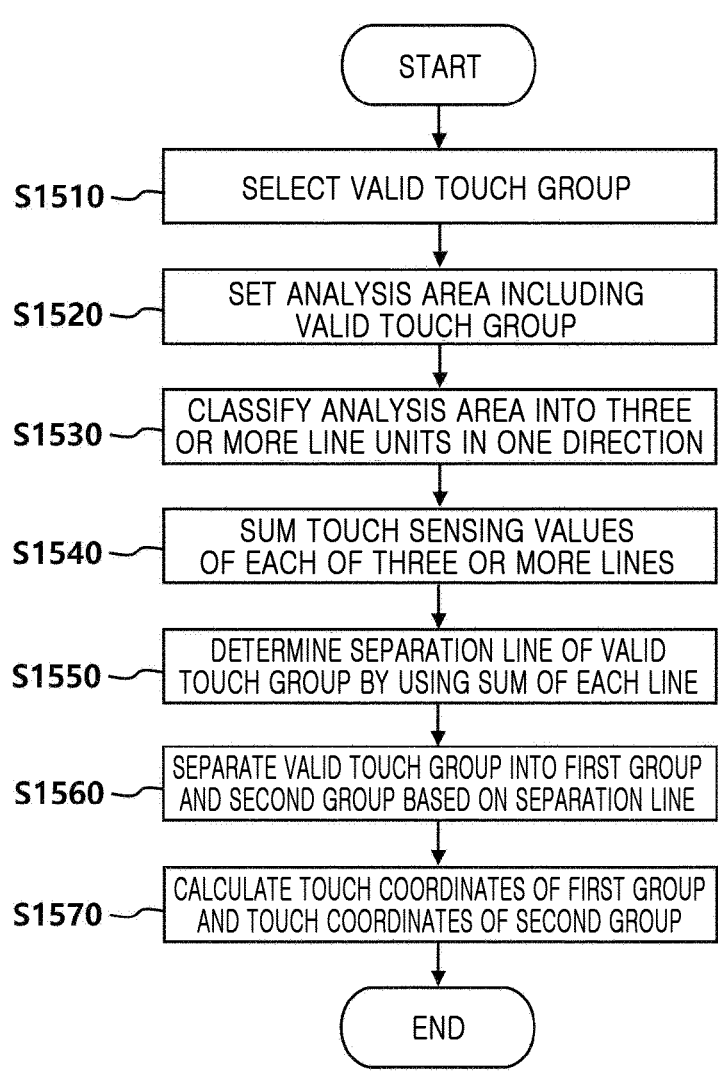

[Fig 16]
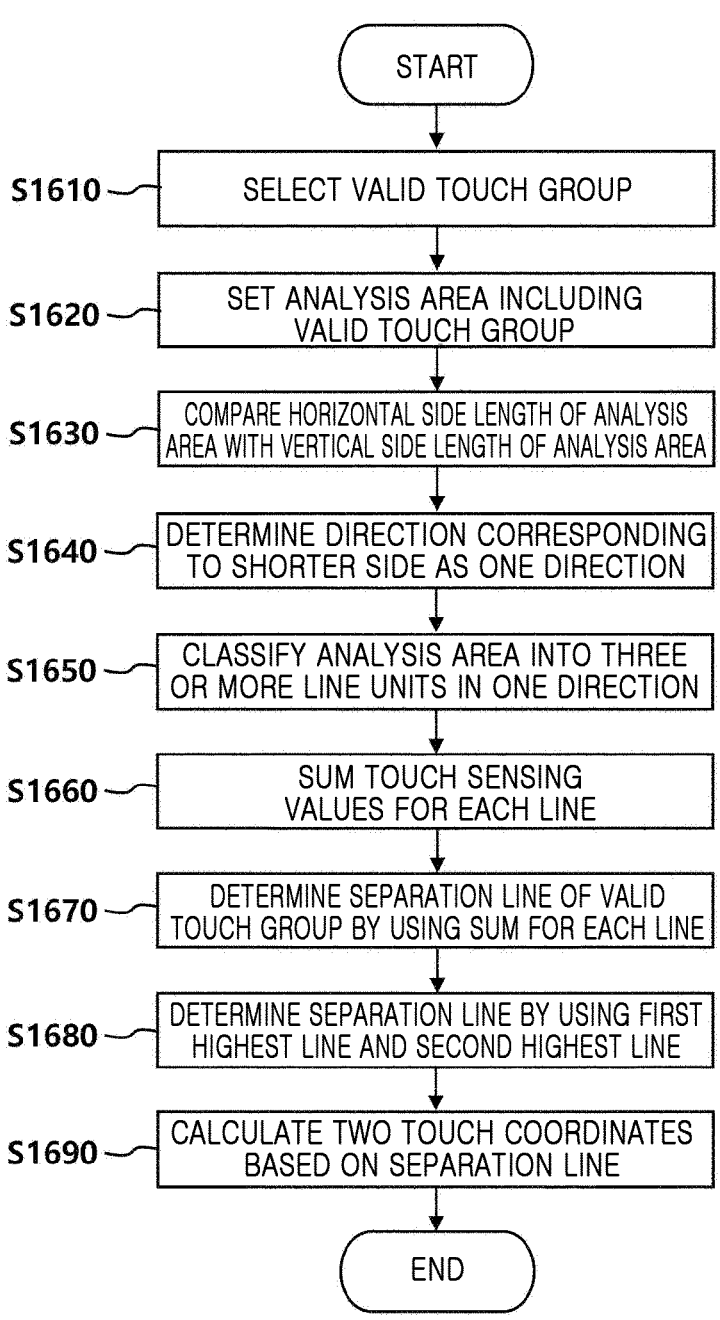

[Fig 17]
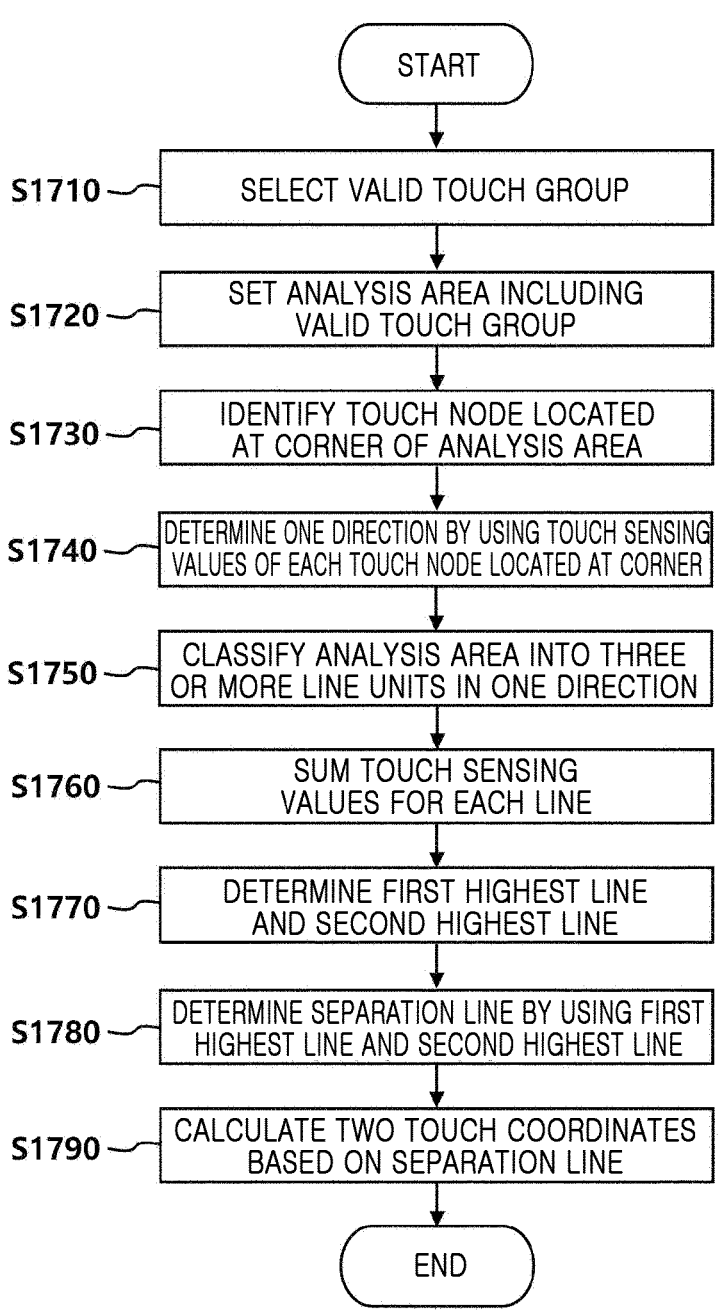

TOUCH SENSING APPARATUS FOR SEPARATION OF A MULTI-TOUCH AND TOUCH SENSING METHOD THEREFOR

CROSS REFERENCE TO RELATED APPLICATION(S)

This application is a 35 U.S.C. § 371 National Phase Entry Application from PCT/KR2022/019230, filed on Nov. 30, 2022, which claims the benefit of Korean Patent Application No. 10-2021-0187176, filed on Dec. 24, 2021, the disclosures of which are herein incorporated by reference in their entirety.

TECHNICAL FIELD

The present embodiment relates to a touch sensing apparatus and a touch sensing method.

BACKGROUND ART

Recently, a multi-touch may be input in display devices including touch panels so as to increase user convenience and recognize various gestures.

In general, when two touch areas corresponding to a multi-touch are adjacent to each other, a display device may determine the two touch areas corresponding to the multi-touch as one touch group. In this case, an error in which the multi-touch is recognized as a single touch may occur in the display device.

Therefore, there is a need for technology that is capable of quickly and accurately separating a multi-touch so that two touch areas are determined as one touch group.

DISCLOSURE

Technical Problem

Against this background, in one aspect, an object of the present embodiment is to provide a technology for quickly and accurately separating a multi-touch in which touch areas are adjacent to each other.

Technical Solution

To achieve the above-described objects, in an aspect, the present embodiment provides touch sensing apparatus including a touch coordinate calculation circuit that selects a valid touch group including two or more valid touch nodes, of which a touch sensing value is greater than or equal to a first reference value from among a plurality of touch nodes that are areas where the plurality of touch sensors are arranged, classifies the valid touch group into three or more line units in one direction, sums touch sensing values for each of the three or more lines, determines a separation line for separating the valid touch group into a first group and a second group from among the three or more lines by using a sum of each of the three or more lines, separates the valid touch group into the first group and the second group based on the separation line, and calculates touch coordinates of the first group and touch coordinates of the second group.

In another aspect, the present embodiment provides a touch sensing method of a touch sensing apparatus, the touch sensing method including: selecting a valid touch group including two or more valid touch nodes, of which a touch sensing value is greater than or equal to a first reference value from among a plurality of touch nodes;

setting a rectangular analysis area including the valid touch group from among the plurality of touch nodes; classifying the analysis area into three or more line units in one direction; summing touch sensing values for each of the three or more lines; determining a separation line for separating the valid touch group into a first group and a second group from among the three or more lines by using a sum of each of the three or more lines; separating the valid touch group into the first group and the second group, based on the separation line; and calculating touch coordinates of the first group and touch coordinates of the second group.

Advantageous Effects

As described above, according to the present embodiment, a multi-touch may be separated quickly and accurately because valid touch groups are classified into line units and a separation line is determined by summing touch sensing values of each line.

BRIEF DESCRIPTION OF DRAWINGS

FIG. 1 is a configuration diagram of a display device according to an embodiment.

FIG. 2 is a diagram for describing a time division driving method of a display device according to an embodiment.

FIGS. 3 and 4 are configuration diagrams of a touch sensing apparatus according to an embodiment.

FIG. 5 is a diagram illustrating a situation in which a user inputs a horizontal or vertical multi-touch on a panel.

FIG. 6 is a diagram for describing a configuration for selecting a horizontal or vertical multi-touch as one valid touch group in a touch coordinate calculation circuit according to an embodiment.

FIGS. 7 to 9 are diagrams for describing a configuration for separating a valid touch group for a horizontal or vertical multi-touch into two groups in a touch coordinate calculation circuit according to an embodiment.

FIG. 10 is a diagram illustrating an example of a situation in which a user inputs a diagonal multi-touch on a panel.

FIG. 11 is a diagram for describing a configuration for selecting a diagonal multi-touch as one valid touch group in a touch coordinate calculation circuit according to an embodiment.

FIGS. 12 to 14 are diagrams for describing a configuration for separating a valid touch group for a diagonal multi-touch into two groups in a touch coordinate calculation circuit according to an embodiment.

FIG. 15 is a flowchart showing a process of calculating touch coordinates for a multi-touch in a touch sensing apparatus according to an embodiment.

FIG. 16 is a flowchart showing a process of calculating touch coordinates for a horizontal or vertical multi-touch in a touch sensing apparatus according to an embodiment.

FIG. 17 is a flowchart showing a process of calculating touch coordinates for a diagonal multi-touch in a touch sensing apparatus according to an embodiment.

MODE FOR INVENTION

FIG. 1 is a configuration diagram of a display device according to an embodiment.

Referring to FIG. 1, a display device 100 may include a panel 110, a data driver (SDIC: Source Driver Integrated Circuit) 120, a gate driver (GDIC: Gate Driver Integrated Circuit) 130, and a data processor (T-CON: Timing Controller) 140, a touch driver (ROIC: ReadOut Integrated Circuit) 150, and a touch controller (T-MCU: Touch Micro Controller Unit) 160.

Here, one or more of the data driver 120, the gate driver 130, and the data processor 140 may be included in a single integrated circuit. These integrated circuits may be referred to as a display driver IC (DDI).

In addition, the touch driver 150 and the touch controller 160 may be included in a single integrated circuit. These integrated circuits may be referred to as a touch integrated circuit (T-IC).

Although FIG. 1 illustrates that the data driver 120 and the touch driver 150 are separate from each other, the data driver 120 and the touch driver 150 may be included in a single integrated circuit. These integrated circuits may be referred to as a source read integrated circuit (SRIC).

In an embodiment, the touch controller 160 may be referred to as a touch sensing apparatus. The T-IC including the touch driver 150 and the touch controller 160 may be referred to as a touch sensing apparatus.

The data driver 120 may drive a data line DL connected to a pixel P, and the gate driver 130 may drive a gate line GL connected to the pixel P. The touch driver 150 may drive a touch sensor TS arranged on the panel 110.

A plurality of data lines DL and a plurality of gate lines GL may be arranged on the panel 110, and a plurality of pixels P may be arranged on the panel 110.

A plurality of touch sensors TS may be arranged on the panel 110.

In other words, the panel 110 may include a display panel and may further include a touch screen panel (TSP). Here, the display panel and the touch panel may share some components. For example, the touch sensors TS of the touch panel may be used as a common electrode to which a common electrode voltage is supplied from the display panel.

The data driver 120 may supply a data voltage to the data line DL so as to display an image on each pixel P of the panel 110. The data driver 120 may include at least one data driver integrated circuit. The at least one data driver integrated circuit may be connected to a bonding pad of the panel 110 by a tape automated bonding (TAB) method or a chip on glass (COG) method, or may be directly formed on the panel 110. In some cases, the data driver 120 may be integrated into the panel 110. In addition, the data driver 120 may be implemented by a chip on film (COF) method.

The data driver 120 may receive image data IMG' and a data control signal DCS from the data processor 140. The data driver 120 may generate a data voltage and drive each pixel according to a grayscale value of each pixel indicated in the image data.

The data control signal DCS may include at least one synchronization signal. For example, the data control signal DCS may include a vertical synchronization signal VSYNC, a horizontal synchronization signal HSYNC, a time division signal, etc.

The data driver 120 may divide frames according to the vertical synchronization signal VSYNC and may drive each pixel in sections other than a vertical blank section indicated by the vertical synchronization signal VSYNC. The data driver 120 may identify image data for each horizontal line according to the horizontal synchronization signal HSYNC and may supply a data voltage for each horizontal line.

As illustrated in FIG. 2, the data driver 120 may divide a display driving period DP and a touch driving period TP according to the time division signal and may drive each pixel within the display driving period DP.

Here, a period corresponding to one frame may include one display driving period DP and one touch driving period TP. In other words, a first frame period may include a first display driving period DP1 and a first touch driving period TP1, and a second frame period may include a second display driving period DP2 and a second touch driving period TP2. A third frame period may include a third display driving period DP3 and a third touch driving period TP3.

The gate driver 130 may supply a scan signal to the gate line GL so as to turn on and off a transistor located in each pixel P. Depending on the driving method, the gate driver 130 may be located on only one side of the panel 110 as illustrated in FIG. 1, or the gate driver 130 may be divided into two parts and located on both sides of the panel 110. In addition, the gate driver 130 may include at least one gate driver integrated circuit, and the at least one gate driver integrated circuit may be connected to the bonding pad of the panel 110 by a tape automated bonding (TAB) method or a chip on glass (COG) method, or the at least one gate driver integrated circuit may be implemented as a gate in panel (GIP) type and directly formed on the panel 110. In some cases, the gate driver 130 may be integrated into the panel 110. In addition, the gate driver 130 may be implemented by a chip on film (COF) method.

The gate driver 130 may receive a gate control signal GCS from the data processor 140. The gate control signal GCS may include a plurality of clock signals. The gate driver 130 may generate a scan signal by using the clock signals and supply the scan signal to the gate line GL.

The data processor 140 receives timing signals input from the host 30, such as a vertical synchronization signal Vsync, a horizontal synchronization signal Hsync, a data enable signal, and a main clock MCLK, and may synchronize operation timings of the data driver 120 and the gate driver 130.

In addition, the data processor 140 may receive image data IMG from the host 30 and may convert the image data IMG into image data IMG' in the form that may be processed by the data driver 120. The data processor 140 may output the converted image data IMG' to the data driver 120.

The touch driver 150 may supply a touch driving signal Tx to the touch sensors TS in the touch driving period (TP in FIG. 2) and may receive a response signal Rx from the touch sensors TS.

The touch driver 150 may generate raw data based on the received response signal Rx. The raw data may be transmitted to the touch controller 160.

The touch controller 160 may define, as a plurality of touch nodes, an area of the panel 110 where the plurality of touch sensors TS are arranged.

The touch controller 160 may calculate touch coordinates based on the raw data.

In other words, the touch controller 160 may calculate touch coordinates for touch input detected from the touch sensors TS.

The touch controller 160 may track a relationship between the touch coordinates by assigning a touch ID (IDentity) to the calculated touch coordinates.

In an embodiment, the touch controller 160 may quickly and accurately separate the multi-touch even when two touch areas for the multi-touch of the user are adjacent to each other as illustrated in FIG. 6 or 11.

A detailed description thereof is as follows.

FIG. 3 is a configuration diagram of a touch sensing apparatus according to an embodiment.

Referring to FIG. 3, the touch sensing apparatus may be a touch controller 160, and the touch sensing apparatus, that is, the touch controller 160, may include a touch coordinate calculation circuit 310 and a touch coordinate tracking circuit 320. The touch controller 160 may further include a touch coordinate correction circuit 330.

When the touch sensing apparatus includes the touch driver 150 and the touch controller 160, the touch sensing apparatus may be a T-IC, and the touch sensing apparatus, that is, the T-IC, may further include the touch driver 150 as illustrated in FIG. 4.

The touch coordinate calculation circuit 310 may calculate touch coordinates for touch input detected from the touch sensors TS, based on the raw data generated by the touch driver 150. Here, the raw data may include touch sensing values detected from each of the plurality of touch sensors TS. In other words, the raw data may include a touch sensing value for each of a plurality of touch nodes.

In an embodiment, when the touch sensor TS is a capacitive touch sensor, the touch sensing value may be a capacitance value of each touch node.

In an embodiment, the touch coordinate calculation circuit 310 may select a valid touch node, of which a touch sensing value is greater than or equal to a first reference value (e.g., 10) from among the plurality of touch nodes, based on the raw data. Here, the first reference value may be a reference value for determining whether the touch sensing value of the touch node is valid or invalid. For example, when the first reference value is smaller than or equal to the touch sensing value detected at the touch node, an actual touch of the user may have been detected at the touch node, and when the first reference value is greater than the touch sensing value detected at the touch node, noise components, etc. may have been detected at the touch node.

When two or more valid touch nodes are connected consecutively at the plurality of touch nodes, the touch coordinate calculation circuit 310 may select a valid touch group including the two or more valid touch nodes.

When the user inputs a horizontal or vertical multi-touch on the panel 110 as illustrated in FIG. 5, the touch coordinate calculation circuit 310 may select the valid touch group, of which the touch sensing value is greater than or equal to the first reference value (e.g., 10) from among the plurality of touch nodes, as illustrated in FIG. 6.

In the valid touch group of FIG. 6, two touch areas corresponding to the multi-touch are adjacent to each other. In other words, an overlapping area is present between a first touch area and a second touch area.

In this case, the touch coordinate calculation circuit 310 has to separate the two touch areas corresponding to the multi-touch from each other and may individually calculate touch coordinates for the first touch area and touch coordinates for the second touch area.

In an embodiment, in order to separate the two touch areas, the touch coordinate calculation circuit 310 may classify the valid touch group into three or more line units in one direction, as illustrated in FIG. 8. Here, the touch coordinate calculation circuit 310 may classify the valid touch group into three or more lines when the number of valid touch nodes included in the valid touch group is greater than or equal to a preset reference number.

In other words, the number of valid touch nodes in the valid touch group corresponding to the multi-touch is greater than the number of valid touch nodes in the valid touch group corresponding to a single touch. For the single touch, the valid touch group need not be separated. Therefore, in an embodiment, a reference number may be set so as to determine whether the valid touch group is the multi-touch or the single touch. When the number of valid touch nodes in the valid touch group is greater than or equal to the reference number, the valid touch group is determined to be the multi-touch and is classified into three or more lines.

When the number of valid touch nodes in the valid touch group is smaller than the reference number, the touch coordinate calculation circuit 310 may calculate single touch coordinates for the valid touch group.

Meanwhile, before classifying the valid touch group into three or more line units in one direction, the touch coordinate calculation circuit 310 may set a rectangular analysis area including the valid touch group as illustrated in FIG. 7. Here, the touch coordinate calculation circuit 310 may set the analysis area by using horizontal side start/end information (e.g., c2/c8 in FIG. 7) and vertical side start/end information (e.g., r4/r7 in FIG. 7) of the valid touch group.

The touch coordinate calculation circuit 310 may compare the horizontal side length with the vertical side length of the analysis area and may determine a direction corresponding to the shorter side as one direction.

For example, since the vertical side length L2 is shorter than the horizontal side length L1 in the analysis area as illustrated in FIG. 7, the touch coordinate calculation circuit 310 may determine the vertical direction of the panel 110 as one direction.

The touch coordinate calculation circuit 310, which has determined one direction, may classify the valid touch groups into three or more lines in one direction and may sum touch sensing values for each of the three or more lines.

For example, when the vertical direction of the panel is one direction, the touch coordinate calculation circuit 310 may divide the valid touch group into seven lines (LINE1 to LINE7 in FIG. 8) corresponding to the vertical direction of the panel 110, as illustrated in FIG. 8. The touch coordinate calculation circuit 310 may sum touch sensing values of (r5,c2) and (r6,c2), which are valid touch nodes included in a first line (LINE1 in FIG. 8), and may sum touch sensing values of (r4,c3), (r5,c3), (r6,c3), and (r7,c3), which are valid touch nodes included in a second line (LINE2 in FIG. 8).

The touch coordinate calculation circuit 310 may calculate the sums of a third line (LINE3 in FIG. 8) to a seventh line (LINE7 in FIG. 8) in the same manner as described above and may calculate the sums (e.g., 47, 131, 96, 51, 98, 150, and 77) of the respective lines.

The touch coordinate calculation circuit 310, which has calculated the sum of each line, may use the sum of each of the three or more lines to determine a separation line (e.g., the overlapping area in FIG. 6) for dividing the valid touch group into a first group (e.g., the first touch area in FIG. 6) and a second group (e.g., the second touch area in FIG. 6) from among the three or more lines.

Specifically, the touch coordinate calculation circuit 310 may determine a first highest line with the highest sum on the first group side and a second highest line with the highest sum on the second group side from among the sums of the respective lines as illustrated in FIG. 9. Here, since the multi-touch involves multiple touch nodes simultaneously sensing two touch inputs, high touch sensing values may be present on both sides (the first group side and the second group side) of the valid touch group. The highest lines with the highest sum may be respectively determined on both sides of the valid touch group. Here, the touch coordinate calculation circuit 310 may prestore a highest line reference value for determining the highest line and may determine the highest line by comparing the prestored sums of the respective lines with the highest line reference value.

In FIG. 8, the first highest line may be the second line LINE2, and the second highest line may be the sixth line LINE6. The sum of the first highest line and the sum of the second highest line may correspond to a first crest and a second crest in a sum graph as illustrated in FIG. 9.

Here, the separation line corresponding to the overlapping area of the multi-touch may be located between the first highest line and the second highest line, and the sum of the touch sensing values may be smaller than the sum of the first highest line and the sum of the second highest line.

Accordingly, the touch coordinate calculation circuit 310 may determine a separation line from among one or more lines located between the first highest line and the second highest line.

The touch coordinate calculation circuit 310 may determine, as the separation line, a line of which the sum is smaller than the sum of the first highest line by a second reference value or more and smaller than the sum of the second highest line by the second reference value or more from among the one or more lines.

For example, in FIG. 8, one or more lines may be the third line LINE3 to the fifth line LINE5, and when the second reference value is 70, the separation line may be determined to be the fourth line LINE4.

In an embodiment, when there are two or more lines of which the sum is smaller than the sum of the first highest line by the second reference value or more and smaller than the sum of the second highest line by the second reference value or more, the touch coordinate calculation circuit 310 may determine, as the separation line, the line with the smallest sum from among the two or more lines.

The sum of the separation line described above may correspond to a valley in the sum graph as illustrated in FIG. 9.

In other words, the touch coordinate calculation circuit 310 determines, as the separation line, the line corresponding to the valley from among the respective lines of the valid touch group.

The touch coordinate calculation circuit 310, which has determined the separation line, may separate the valid touch group into the first group and the second group, based on the separation line.

The touch coordinate calculation circuit 310 may calculate touch coordinates of the first group and touch coordinates of the second group. Here, the touch coordinate calculation circuit 310 may change the touch sensing values of the valid touch nodes corresponding to the separation line to a touch sensing value smaller than the first reference value. In other words, the touch coordinate calculation circuit 310 may change the valid touch nodes corresponding to the separation line to invalid touch nodes.

The configuration in which the touch coordinate calculation circuit 310 separates the multi-touch input in the horizontal or vertical direction of the panel 110 has been described above.

Hereinafter, a configuration in which the touch coordinate calculation circuit 310 separates the multi-touch the user inputs on the panel 110 in a diagonal direction, as illustrated in FIG. 10, is described.

First, when the user inputs a diagonal multi-touch on the panel 110 as illustrated in FIG. 10, the touch coordinate calculation circuit 310 may select a valid touch group, of which a touch sensing value is greater than or equal to a first reference value from among a plurality of touch nodes, as illustrated in FIG. 11.

In FIG. 11, in the valid touch group, two touch areas corresponding to the multi-touch are adjacent to each other, and an overlapping area is present between a first touch area and a second touch area. Here, the overlapping area may be present in the same diagonal direction as an multi-touch input direction.

In this case, the touch coordinate calculation circuit 310 has to determine, as the diagonal direction of the panel 110, one direction for classifying three or more lines.

In order to determine the diagonal direction of the panel 110 as one direction, the touch coordinate calculation circuit 310 may set a rectangular analysis area including the valid touch group as illustrated in FIG. 12 and may determine one direction by using touch sensing values of touch nodes ((r3,c4), (r3,c7), (r8,c4), and (r8,c7) in FIG. 12) respectively located at four corners of the analysis area.

Specifically, the touch coordinate calculation circuit 310 may calculate a first comparison value by summing a touch sensing value of a first touch node ((r3,c4) in FIG. 12, indicated by a dashed rhombus) located at a first corner and a touch sensing value of a second touch node ((r8,c7) in FIG. 12, indicated by a dashed rhombus) located at a second corner facing the first corner in a first diagonal direction.

The touch coordinate calculation circuit 310 may calculate a second comparison value by summing a touch sensing value of a third touch node ((r3,c7) in FIG. 12, indicated by a dashed circle) located at a third corner and a touch sensing value of a fourth touch node ((r8,c4) in FIG. 12, indicated by a dashed circle) located at a fourth corner facing the second corner in a second diagonal direction.

The touch coordinate calculation circuit 310 may compare the first comparison value with the second comparison value and may determine the diagonal direction with the smaller value as one direction.

In FIG. 12, since the first comparison value is 4 and the second comparison value is 50, the touch coordinate calculation circuit 310 may determine the first diagonal direction, which is an upper left-lower right direction, as one direction.

In other words, the touch coordinate calculation circuit 310 may determine, as one direction, a diagonal direction opposite to the diagonal direction in which the multi-touch is input.

For example, when the multi-touch is input in the second diagonal direction, which is an upper right-lower left direction, the valid touch nodes are present in the third corner and the fourth corner corresponding to the second diagonal direction, and the valid touch nodes are not present in the first corner and the second corner corresponding to the first diagonal direction. Therefore, the first comparison value may be smaller than the second comparison value. In this manner, the touch coordinate calculation circuit 310 may determine the first diagonal direction, which is the diagonal direction opposite to the second diagonal direction, as one direction.

The touch coordinate calculation circuit 310, which has determined one direction, may classify the valid touch groups into three or more lines in one direction and may sum touch sensing values for each of the three or more lines.

For example, when the first diagonal direction of the panel is one direction, the touch coordinate calculation circuit 310 may divide the valid touch group into nine lines (LINE1 to LINE9 in FIG. 13) corresponding to the first diagonal direction of the panel 110, as illustrated in FIG. 13. The touch coordinate calculation circuit 310 may sum touch a sensing value of (r3,c7), which is a valid touch node included in a first line (LINE1 in FIG. 13), and may sum touch sensing values of (r3,c6) and (r4,c7), which are valid touch nodes included in a second line (LINE2 in FIG. 13).

The touch coordinate calculation circuit 310 may calculate the sums of a third line (LINE3 in FIG. 13) to a ninth line (LINE9 in FIG. 13) in the same manner as described above and may calculate the sums (e.g., 26, 86, 161, 106, 63, 104, 161, 85, and 24) of the respective lines.

The touch coordinate calculation circuit 310, which has calculated the sum of each line, may use the sum of each of the three or more lines to determine a separation line (e.g., the overlapping area in FIG. 11) for dividing the valid touch group into a first group (e.g., the first touch area in FIG. 11) and a second group (e.g., the second touch area in FIG. 11) from among the three or more lines. Here, the sum of each line may form a graph as illustrated in FIG. 14, and the touch coordinate calculation circuit 310 may determine the third line (LINE3 in FIG. 13) as the first highest line and may determine the seventh line (LINE7 in FIG. 13) as the second highest line.

The touch coordinate calculation circuit 310 may determine a separation line from among one or more lines located between the first highest line and the second highest line.

The touch coordinate calculation circuit 310 may determine, as the separation line, a line of which the sum is smaller than the sum of the first highest line by a second reference value or more and smaller than the sum of the second highest line by the second reference value or more from among the one or more lines.

When there are two or more lines of which the sum is smaller than the sum of the first highest line by the second reference value or more and smaller than the sum of the second highest line by the second reference value or more, the touch coordinate calculation circuit 310 may determine, as the separation line, the line with the smallest sum from among the two or more lines.

For example, the touch coordinate calculation circuit 310 may determine the fifth line (LINE5 in FIG. 13), which is a line corresponding to a valley in FIG. 14, as the separation line.

The touch coordinate calculation circuit 310, which has determined the separation line, may separate the valid touch group into the first group and the second group, based on the separation line.

The touch coordinate calculation circuit 310 may calculate touch coordinates of the first group and touch coordinates of the second group.

The touch coordinate tracking circuit 320 assigns a touch ID to the touch coordinates calculated by the touch coordinate calculation circuit 310. Here, the touch ID may be information for associating the touch coordinates calculated by the touch coordinate calculation circuit 310.

In an embodiment, the touch coordinate tracking circuit 320 may assign, to the touch coordinates of the first group and the touch coordinates of the second group, touch IDs corresponding to the multi-touch.

The touch coordinate tracking circuit 320 may output the touch coordinates and the touch ID of the first group and the touch coordinates and the touch ID of the second group to the touch coordinate correction circuit 330.

The touch coordinate correction circuit 330 may correct the touch coordinates output from the touch coordinate tracking circuit 320 by using a smoothing technique. Here, the smoothing technique may refer to a technique for reducing noise in touch coordinates.

The touch coordinates corrected by the touch coordinate correction circuit 330 and the touch ID assigned to the touch coordinates may be output to the host 30.

In other words, the touch coordinates of the first group and the touch ID corresponding to the multi-touch, and the touch coordinates of the second group and the touch ID corresponding to the multi-touch may be output to the host 30.

As described above, since the touch sensing apparatus including the touch coordinate calculation circuit 310 classifies the valid touch groups into line units and sums the touch sensing values of the respective lines to determine the separation line, the multi-touch may be separated quickly and accurately.

A process by which the touch sensing apparatus separates a multi-touch and calculates touch coordinates is described below.

FIG. 15 is a flowchart showing a process of calculating touch coordinates for a multi-touch in a touch sensing apparatus according to an embodiment. Here, the touch sensing apparatus may be the touch controller 160 or may be the T-IC including the touch driver 150 and the touch controller 160.

Referring to FIG. 15, the touch sensing apparatus may select a valid touch group including two or more valid touch nodes, of which the touch sensing values are greater than or equal to a first reference value from among a plurality of touch nodes, based on raw data (S1510). Here, the first reference value may be a reference value for determining whether the touch sensing value of the touch node is valid or invalid. The touch sensing apparatus may set a rectangular analysis area including the valid touch group from among the plurality of touch nodes and classify the analysis area into three or more lines in one direction (S1520, S1530).

The touch sensing apparatus may sum the touch sensing values for each of the three or more lines and then use the sum of each of the three or more lines to determine a separation line for separating the valid touch group into a first group and a second group from among the three or more lines (S1540, S1550).

The touch sensing apparatus may separate the valid touch group into the first group and the second group, based on the separation line, and may calculate touch coordinates of the first group and touch coordinates of the second group (S1560, S1570).

The process described above may be more specific depending on the direction of the multi-touch input by the user.

FIG. 16 is a flowchart showing a process of calculating touch coordinates for a horizontal or vertical multi-touch in a touch sensing apparatus according to an embodiment.

Referring to FIG. 16, the touch sensing apparatus may select a valid touch group including two or more valid touch nodes, of which the touch sensing values are greater than or equal to a first reference value from among a plurality of touch nodes, based on raw data (S1610).

The touch sensing apparatus may set a rectangular analysis area including the valid touch group from among the plurality of touch nodes (S1620).

The touch sensing apparatus may compare the horizontal side length of the analysis area with the vertical side length of the analysis area and may determine the direction corresponding to the shorter side as one direction (S1630, S1640).

The touch sensing apparatus may classify the touch sensing values of the valid touch group included in the analysis area into three or more line units in one direction (S1650).

After summing the touch sensing values for each of the three or more lines, the touch sensing apparatus may determine the first highest line with the highest sum on the first group side and the second highest line with the highest sum on the second group side from among the three or more lines (S1660, S1670).

The touch sensing apparatus may determine the separation line by using the first highest line and the second highest line (S1680). In operation S1680, the touch sensing apparatus may determine, as the separation line, a line of which the sum is smaller than the sum of the first highest line by the second reference value or more and smaller than the sum of the second highest line by the second reference value or more from among one or more lines located between the first highest line and the second highest line.

The touch sensing apparatus may separate the valid touch group into the first group and the second group, based on the separation line, and may calculate touch coordinates of the first group and touch coordinates of the second group (S1690).

After operation S1690, the touch sensing apparatus may assign, to the touch coordinates of the first group and the touch coordinates of the second group, touch IDs corresponding to the multi-touch.

The touch sensing apparatus may output, to the host 30, the touch coordinates of the first group, the touch coordinates of the second group, and the touch IDs corresponding to the multi-touch.

FIG. 17 is a flowchart showing a process of calculating touch coordinates for a diagonal multi-touch in a touch sensing apparatus according to an embodiment.

Referring to FIG. 17, the touch sensing apparatus may select a valid touch group including two or more valid touch nodes, of which the touch sensing values are greater than or equal to a first reference value from among a plurality of touch nodes, based on raw data (S1710).

The touch sensing apparatus may set a rectangular analysis area including the valid touch group from among the plurality of touch nodes (S1720).

The touch sensing apparatus identify touch nodes located at corners of the analysis area and may determine one direction by using the touch sensing values of the respective touch nodes located at the corners (S1730, S1740). In operation S1740, the touch sensing apparatus may calculate a first comparison value by summing a touch sensing value of a first touch node located at a first corner of the analysis area and a touch sensing value of a second touch node located at a second corner of the analysis area facing the first corner in a first diagonal direction. The touch sensing apparatus may calculate a second comparison value by summing a touch sensing value of a third touch node located at a third corner of the analysis area and a touch sensing value of a fourth touch node located at a fourth corner of the analysis area facing the third corner in a second diagonal direction. Thereafter, the touch sensing apparatus may compare the first comparison value with the second comparison value and may determine the diagonal direction with the smaller value as one direction.

After operation S1740, the touch sensing apparatus may classify the touch sensing values of the valid touch group included in the analysis area into three or more line units in one direction (S1750).

After summing the touch sensing values for each of the three or more lines, the touch sensing apparatus may determine the first highest line with the highest sum on the first group side and the second highest line with the highest sum on the second group side from among the three or more lines (S1760, S1770).

The touch sensing apparatus may determine the separation line by using the first highest line and the second highest line (S1780). In operation S1780, the touch sensing apparatus may determine, as the separation line, a line of which the sum is smaller than the sum of the first highest line by the second reference value or more and smaller than the sum of the second highest line by the second reference value or more from among one or more lines located between the first highest line and the second highest line.

The touch sensing apparatus may separate the valid touch group into the first group and the second group, based on the separation line, and may calculate touch coordinates of the first group and touch coordinates of the second group (S1790).

After operation S1790, the touch sensing apparatus may assign, to the touch coordinates of the first group and the touch coordinates of the second group, touch IDs corresponding to the multi-touch.

The touch sensing apparatus may output, to the host 30, the touch coordinates of the first group, the touch coordinates of the second group, and the touch IDs corresponding to the multi-touch.

In an embodiment, when the touch sensing apparatus fails to determine the separation line through operations S1630 to S1680 of FIG. 16, the touch sensing apparatus may determine the separation line through operations S1740 to S1780 of FIG. 17.

In contrast, when the touch sensing apparatus fails to determine the separation line through operations S1740 to S1780 of FIG. 17, the touch sensing apparatus may determine the separation line through operations S1630 to S1680 of FIG. 16.

The invention claimed is:

1. A touch sensing apparatus comprising a touch coordinate calculation circuit configured to
   select a valid touch group including two or more valid touch nodes, of which a touch sensing value is greater than or equal to a first reference value from among a plurality of touch nodes, classify the valid touch group into three or more lines in one direction, sum touch sensing values for each of the three or more lines, determine a separation line for separating the valid touch group into a first group and a second group from among the three or more lines by using a sum of each of the three or more lines, separate the valid touch group into the first group and the second group based on the separation line, and calculate touch coordinates of the first group and touch coordinates of the second group,
   wherein the separation line is determined from among the three or more lines; and
   a touch coordinate tracking circuit configured to assign a touch ID to the touch coordinates calculated by the touch coordinate calculation circuit.

2. The touch sensing apparatus of claim 1, wherein the touch coordinate calculation circuit is configured to classify the valid touch group into the three or more lines when a number of valid touch nodes included in the valid touch group is greater than or equal to a preset reference number.

3. The touch sensing apparatus of claim 1, wherein the touch coordinate calculation circuit is configured to set a rectangular analysis area including the valid touch group, compare a horizontal side length with a vertical side length of the analysis area, and determine a direction corresponding to a side with a shorter length as the one direction.

4. The touch sensing apparatus claim 1, wherein the touch coordinate calculation circuit is configured to determine a first highest line with a highest sum on a first group side and a second highest line with a highest sum on a second group side from among the three or more lines, and determine the separation line from among one or more lines located between the first highest line and the second highest line.

5. The touch sensing apparatus of claim 4, wherein the touch coordinate calculation circuit is configured to determine, as the separation line, a line of which a sum is smaller than a sum of the first highest line by a second reference value or more and smaller than a sum of the second highest line by the second reference value or more from among the one or more lines.

6. The touch sensing apparatus of claim 5, wherein, when there are two or more lines of which sum is smaller than the sum of the first highest line by the second reference value or more and smaller than the sum of the second highest line by the second reference value or more, the touch coordinate calculation circuit is configured to determine, as the separation line, a line with a smallest sum from among the two or more lines.

7. The touch sensing apparatus of claim 1, wherein the touch coordinate calculation circuit is configured to set a rectangular analysis area including the valid touch group and determine the one direction by using touch sensing values of touch nodes respectively located at four corners of the analysis area.

8. The touch sensing apparatus of claim 7, wherein the touch coordinate calculation circuit is configured to calculate a first comparison value by summing a touch sensing value of a first touch node located at a first corner and a touch sensing value of a second touch node located at a second corner facing the first corner in a first diagonal direction, calculate a second comparison value by summing a touch sensing value of a third touch node located at a third corner and a touch sensing value of a fourth touch node located at a fourth corner facing the third corner in a second diagonal direction, compare the first comparison value with the second comparison value, and determine a diagonal direction with a smaller value as the one direction.

9. The touch sensing apparatus claim 1, wherein one line includes one or more valid touch nodes included in the valid touch group, and the touch coordinate calculation circuit is configured to calculate a sum of the one line by summing touch sensing values of each of the one or more valid touch nodes included in the one line.

10. A touch sensing method of a touch sensing apparatus, the touch sensing method comprising:

selecting a valid touch group including two or more valid touch nodes, of which a touch sensing value is greater than or equal to a first reference value from among a plurality of touch nodes;

setting a rectangular analysis area including the valid touch group from among the plurality of touch nodes;

classifying the analysis area into three or more lines in one direction;

summing touch sensing values for each of the three or more lines;

determining a separation line for separating the valid touch group into a first group and a second group from among the three or more lines by using a sum of each of the three or more lines;

separating the valid touch group into the first group and the second group, based on the separation line;

calculating touch coordinates of the first group and touch coordinates of the second group, assigning, to the touch coordinates of the first group and the touch coordinates of the second group, touch identities (IDs) corresponding to a multi-touch; and outputting, to a host, the touch coordinates of the first group, the touch coordinates of the second group, and the touch IDs.

11. The touch sensing method of claim 10, wherein the classifying comprises:

comparing a horizontal side length of the analysis area with a vertical side length of the analysis area and determining, as the one direction, a direction corresponding to a side with a shorter length; and classifying touch sensing values of the valid touch group included in the analysis area into the three or more lines in the one direction.

12. The touch sensing method of claim 10, wherein the classifying comprises:

calculating a first comparison value by summing a touch sensing value of a first touch node located at a first corner of the analysis area and a touch sensing value of a second touch node located at a second corner of the analysis area facing the first corner in a first diagonal direction;

calculating a second comparison value by summing a touch sensing value of a third touch node located at a third corner of the analysis area and a touch sensing value of a fourth touch node located at a fourth corner of the analysis area facing the third corner in a second diagonal direction;

comparing the first comparison value with the second comparison value and determining a diagonal direction with a smaller value as the one direction; and classifying touch sensing values of the valid touch group included in the analysis area into the three or more lines in the one direction.

13. The touch sensing method claim 10, wherein the determining comprises:

determining a first highest line with a highest sum on a first group side and a second highest line with a highest sum on a second group side from among the three or more lines; and determining, as the separation line, a line of which a sum is smaller than a sum of the first highest line by a second reference value or more and smaller than a sum of the second highest line by the second reference value or more from among one or more lines located between the first highest line and the second highest line.

* * * * *